US012586173B2

(12) United States Patent　　　(10) Patent No.:　US 12,586,173 B2
　　Kikuchi　　　　　　　　　　　(45) Date of Patent:　　Mar. 24, 2026

(54) APPARATUS FOR HAIR INSPECTION ON SUBSTRATE AND METHOD FOR HAIR INSPECTION ON SUBSTRATE

(71) Applicant: CKD CORPORATION, Aichi (JP)

(72) Inventor: Kazuyoshi Kikuchi, Aichi (JP)

(73) Assignee: CKD Corporation, Aichi (JP)

( * ) Notice: Subject to any disclaimer, the term of this patent is extended or adjusted under 35 U.S.C. 154(b) by 288 days.

(21) Appl. No.: 18/435,627

(22) Filed: Feb. 7, 2024

(65) Prior Publication Data

US 2024/0193751 A1　　Jun. 13, 2024

Related U.S. Application Data

(63) Continuation of application No. PCT/JP2022/012242, filed on Mar. 17, 2022.

(30) Foreign Application Priority Data

Sep. 17, 2021　(JP) ................................. 2021-152035

(51) Int. Cl.
　　*G06T 7/00*　　　(2017.01)
　　*G06T 7/174*　　(2017.01)
　　*G06T 7/90*　　　(2017.01)
(52) U.S. Cl.
　　CPC ............ *G06T 7/0004* (2013.01); *G06T 7/174* (2017.01); *G06T 7/90* (2017.01);
　　　　　　　(Continued)
(58) Field of Classification Search
　　CPC ......... G06T 7/0004; G06T 7/174; G06T 7/90; G06T 2207/10024; G06T 2207/30141; G06T 2207/30168
　　See application file for complete search history.

(56) References Cited

U.S. PATENT DOCUMENTS 6,145,648 A　*　11/2000　Teichman ......... H05K 13/0061
　　　　　　　　　　　　　　　　198/774.1
6,381,355 B1 *　4/2002　Goonetilleke ... G01N 21/95607
　　　　　　　　　　　　　　　　382/141

(Continued)

FOREIGN PATENT DOCUMENTS

JP　　　2017125861 A　　7/2017

OTHER PUBLICATIONS

International Preliminary Report on Patentability issued in corresponding International Application No. PCT/JP2022/012242 mailed Mar. 5, 2024 (9 pages).

(Continued)

*Primary Examiner* — Dave Czekaj
(74) *Attorney, Agent, or Firm* — Osha Bergman Watanabe & Burton LLP

(57)　　　　　ABSTRACT

An apparatus for hair inspection includes: an inspection unit that obtains, with a plurality of color lights, a color image of an inspection object board that is the printed circuit board as an inspection target; and a control device that: obtains a hue image of the inspection object board from the color image; obtains a saturation image of the inspection object board from the color image; detects first hair including at least one of brown hair and blond hair in at least the resist area of the hue image based on a hue difference of the first hair relative to the resist area; and detects second hair including at least one of black hair and grey hair in at least the resist area of the saturation image based on a saturation difference of the second hair relative to the resist area.

7 Claims, 8 Drawing Sheets

(52) U.S. Cl.
CPC .............. *G06T 2207/10024* (2013.01); *G06T
2207/30141* (2013.01); *G06T 2207/30168*
(2013.01)

(56) References Cited

U.S. PATENT DOCUMENTS

| | | | | |
|---|---|---|---|---|
| 2003/0185432 | A1* | 10/2003 | Hong ........................ | G06T 7/30 |
| | | | | 382/151 |
| 2014/0158399 | A1* | 6/2014 | Ulmer ................... | H05K 3/225 |
| | | | | 174/250 |

OTHER PUBLICATIONS

International Search Report issued in corresponding International Application No. PCT/JP2022/012242, dated May 24, 2022, with translation (5 pages).
Written Opinion issued in corresponding International Application No. PCT/JP2022/012242, dated May 24, 2022 (4 pages).

* cited by examiner

FIG. 5

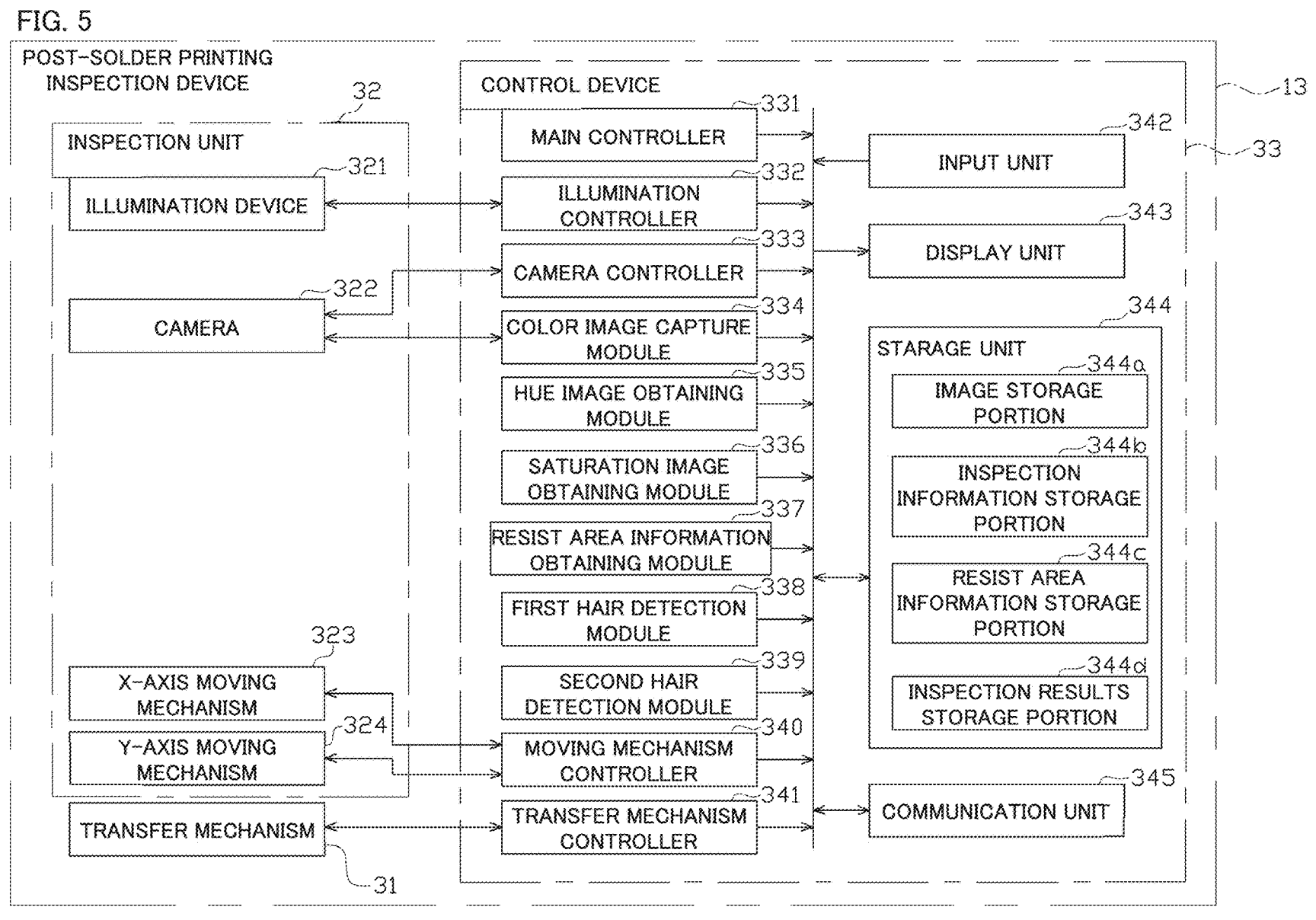

POST-SOLDER PRINTING INSPECTION DEVICE — 13

INSPECTION UNIT — 32

ILLUMINATION DEVICE — 321

CAMERA — 322

X-AXIS MOVING MECHANISM — 323

Y-AXIS MOVING MECHANISM — 324

TRANSFER MECHANISM — 31

CONTROL DEVICE — 33

MAIN CONTROLLER — 331

ILLUMINATION CONTROLLER — 332

CAMERA CONTROLLER — 333

COLOR IMAGE CAPTURE MODULE — 334

HUE IMAGE OBTAINING MODULE — 335

SATURATION IMAGE OBTAINING MODULE — 336

RESIST AREA INFORMATION OBTAINING MODULE — 337

FIRST HAIR DETECTION MODULE — 338

SECOND HAIR DETECTION MODULE — 339

MOVING MECHANISM CONTROLLER — 340

TRANSFER MECHANISM CONTROLLER — 341

INPUT UNIT — 342

DISPLAY UNIT — 343

STARAGE UNIT — 344

IMAGE STORAGE PORTION — 344a

INSPECTION INFORMATION STORAGE PORTION — 344b

RESIST AREA INFORMATION STORAGE PORTION — 344c

INSPECTION RESULTS STORAGE PORTION — 344d

COMMUNICATION UNIT — 345

FIG. 6

APPARATUS FOR HAIR INSPECTION ON SUBSTRATE AND METHOD FOR HAIR INSPECTION ON SUBSTRATE

BACKGROUND

Technical Field

The present disclosure relates to an apparatus for and a method of performing an inspection for the presence or the absence of hair in a resist area on a printed circuit board.

Description of Related Art

A printed circuit board includes a base board in a flat plate-like shape, a circuit pattern and lands formed on a surface of the base board, and an insulating resist provided to coat a portion other than the lands on the surface of the base board.

In general, a board manufacturing line of mounting components (for example, electronic components) on the printed circuit board first prints solder paste on the lands (solder printing process). The board manufacturing line then temporarily mounts the components on the printed circuit board, based on the viscosity of the solder paste (mounting process). The board manufacturing line subsequently transfers this printed circuit board to a reflow furnace to heat and fuse the solder paste and to solder the components (reflow process).

In this board manufacturing line, an inspection is generally performed for the presence or the absence of any foreign substance on the printed circuit board, based on image data obtained by taking images of the printed circuit board with solder paste printed thereon. One example of such foreign substance is hair. In the case where hair adheres to an area provided with a resist (hereinafter referred to as "resist area") on the printed circuit board, there is a possibility that the hair is carbonized in the course of heating in the reflow furnace and causes a short circuit between a plurality of lands.

As a technique of detecting a foreign substance such as hair, for example, a method of detecting a first foreign substance (a foreign substance of a light attribute) and a second foreign substance (a foreign substance of a dark attribute) by using lightness and saturation has been proposed (as described in, for example, Patent Literature 1).

The following describes the method of detecting the foreign substance of Patent Literature 1 more in detail. The method first uses a plurality of color lights to obtain a plurality of different color master images with regard to a master board and obtains a master board image by summing up lightness values of these different color master images in the unit of respective pixels. The method also uses the plurality of color lights to obtain a plurality of different color measurement images with regard to a printed circuit board (a board to be measured or a measurement board) as an inspection target and obtains a measurement board image by summing up lightness values of these different color measurement images in the unit of respective pixels. Accordingly, this method obtains respective lightness-related images of the master board and of the measurement board. This method then detects the first foreign substance, based on a difference between the master board image and the measurement board image (i.e., a difference in lightness).

The method also uses the different color master images to create a saturation map with regard to the master board and uses the different color measurement images to create a saturation map with regard to the measurement board. Accordingly, this method obtains respective saturation-related images of the master board and of the measurement board. This method then detects the second foreign substance, based on a difference between these saturation maps.

Patent Literature 1 also describes exclusion of areas including holes and an area including a circuit pattern in the printed circuit board from the inspection target, as well as the method described above.

PATENT LITERATURE

Patent Literature 1: Japanese Patent No. 2017-125861A

The method described in the above Patent Literature 1, however, has a possibility of detecting a difference caused by a circuit pattern, a height difference or a flaw, as well as a difference caused by the presence or the absence of hair, as a difference between the master board image and the measurement board image (i.e., a difference between the lightness-related images). This may accordingly cause misdetection of a circuit pattern, a height difference or a flaw as hair. A resist is generally translucent, so that a height difference under the resist, as well as a height difference on an upper face of the resist may be wrongly detected as hair.

It is thought that one available technique excludes an area including a circuit patter from the inspection target. This technique, however, fails to perform an inspection for the presence or the absence of hair in this excluded area. Moreover, even if this technique manages to prevent misdetection of a circuit pattern or a height difference caused by the circuit pattern as hair, there is still a possibility of misdetection of a flaw as hair. Furthermore, the process of excluding the area including the circuit pattern from the inspection target may be extremely troublesome.

Additionally, there are hairs of various colors, such as black hair, brown hair, gray hair and blond hair. There tends to be a relatively small lightness difference or a relatively small saturation difference between a resist area and especially brown hair or blond hair among these hairs of various colors. Accordingly, the method of using the lightness and the saturation as described above may provide an insufficient detection accuracy of the brown hair or the blond hair adhering to the resist area.

SUMMARY

By taking into account the circumstances described above, one or more embodiments of the present disclosure provide, for example, an apparatus for hair inspection on a board that more certainly prevents misdetection of a circuit pattern, a height difference or a flaw as hair without excluding an area including the circuit pattern from an inspection target and enables hair including blond hair and brown hair to be detected with high accuracy.

The following describes each of various aspects of the present disclosure. Functions and advantageous effects that are characteristic of each of the aspects are also described as appropriate.

Aspect 1. There is provided an apparatus for hair inspection in a green resist area on a printed circuit board on which solder paste is printed. The apparatus for hair inspection comprises a color image obtaining unit (i.e., an inspection unit) configured to use a plurality of color lights such as to obtain a color image of an inspection object board that is the printed circuit board as an inspection target; a hue image obtaining unit (i.e., a control device) configured to obtain a hue image of the inspection object board from the color image; a saturation image obtaining unit (i.e., the control device) configured to obtain a saturation image of the inspection object board from the color image; a first hair detection unit (i.e., the control device) configured to detect first hair including at least one of brown hair and blond hair in at least the resist area of the hue image based on a hue difference of the first hair relative to the resist area; and a second hair detection unit (i.e., the control device) configured to detect second hair including at least one of black hair and grey hair in at least the resist area of the saturation image based on a saturation difference of the second hair relative to the resist area. The first hair detection unit is configured to detect the first hair based on only the hue image without a lightness image of the inspection object board, and the second hair detection unit is configured to detect the second hair based on only the saturation image without the lightness image of the inspection object board.

The configuration of above Aspect 1 allows for detection of the hair including at least the brown hair and/or the blond hair as the first hair in at least the resist area of the hue image by utilizing the hue difference relative to the resist area. More specifically, this configuration focuses on especially a difference in hue which the first hair such as the brown hair or the blond hair readily has relative to the green resist area and detects the first hair by using this hue difference. Accordingly, this configuration enables the first hair such as the brown hair or the blond hair located in the resist area to be detected with high accuracy.

The configuration of above Aspect 1 also allows for detection of the hair including at least the black hair and/or the gray hair as the second hair in at least the resist area of the saturation image by utilizing the saturation difference relative to the resist area. More specifically, this configuration focuses on especially a difference in saturation which the second hair such as the black hair or the gray hair readily has relative to the green resist area and detects the second hair by using this saturation difference. Accordingly, this configuration enables the second hair such as the black hair or the gray hair located in the resist area to be detected with high accuracy. As described above, the configuration of above Aspect 1 enables each of the hairs of common colors, for example, black hair, gray hair, brown hair or blond hair, to be detected with high accuracy.

The configuration of above Aspect 1 also performs detection of the respective hairs by utilizing only the hue image and the saturation image without using a lightness image of the inspection object board. Accordingly, this configuration more certainly prevents misdetection of a circuit pattern, a height difference or a flaw as hair by using the lightness image. Furthermore, this configuration without using the lightness image reduces the load relating to the inspection processing.

Additionally, the configuration of above Aspect 1 prevents misdetection caused by a circuit pattern, a height difference or the like as described above and thereby does not require a troublesome process of excluding an area including the circuit pattern from an inspection target for the purpose of preventing the misdetection. This more effectively reduces the load of the inspection-related processing and suppresses an increase in cost with regard to the inspection and the speed-up of the inspection.

Aspect 2. The apparatus for hair inspection described in above Aspect 1 may further comprise a resist area information obtaining unit configured to obtain resist area information that specifies a range occupied by the resist area in the inspection object board. The first hair detection unit and the second hair detection unit may be configured to respectively detect the first hair and the second hair with respect to, as the inspection target, the resist area specified by at least the resist area information obtained by the resist area information obtaining unit.

The configuration of above Aspect 2 allows for selective inspection of the resist area with regard to the presence or the absence of hair. This more certainly avoids a potential risk caused by carbonization of hair located in the resist area.

Aspect 3. In the apparatus for hair inspection described in above Aspect 2, the resist area information obtaining unit may be configured to obtain the resist area information based on at least one of design information and manufacture information of the printed circuit board.

One example of the design information is CAD data of the printed circuit board, and one example of the manufacture information is Gerber data of the printed circuit board.

The configuration of above Aspect 3 enables the sufficiently accurate resist area information to be readily obtained according to the relationship to the inspection object board by using the design information and the manufacture information.

Aspect 4. The apparatus for hair inspection described in above Aspect 2 may further comprise a master color image obtaining unit configured to obtain a master color image with regard to a master board that is an ideal printed circuit board by using a plurality of color lights. The resist area information obtaining unit may be configured to obtain the resist area information by at least one of: obtaining a hue image of the master board from the master color image, and extracting from the hue image an area having a hue that matches a hue of the resist area, and obtaining a saturation image of the master board from the master color image, and extracting from the saturation image an area having a saturation that matches a saturation of the resist area.

The configuration of above Aspect 4 uses the master board to obtain the resist area information. This configuration accordingly enables sufficiently accurate resist area information to be obtained according to a relationship to the inspection object board without using design information or manufacture information.

In a configuration of obtaining the resist area information by extracting an area having a lightness substantially equal to a lightness of the resist area from a lightness image, there is a possibility of misdetection of, for example, a circuit pattern or a height difference present at a position overlapping the resist area, as a non-resist area. The configuration of above Aspect 4, on the other hand, obtains the resist area information by extracting the area having the hue substantially equal to the hue of the resist area from the hue image and/or by extracting the area having the saturation substantially equal to the saturation of the resist area from the saturation image. This enables the resist area of the master board to be specified with higher accuracy and thereby enables the more accurate resist area information to be obtained. As a result, this configuration enables an inspection to be performed more appropriately for the resist area of the inspection object board.

Aspect 5. In the apparatus for hair inspection described in above Aspect 2, the resist area information obtaining unit may be configured to obtain the resist area information by at least one of extracting, from the hue image of the inspection object board, an area having a hue that matches a hue of the resist area, and extracting, from the saturation image of the inspection object board, an area having a saturation that matches a saturation of the resist area.

Like the configuration of Aspect 4 described above, the configuration of above Aspect 5 more certainly prevents misdetection of, for example, a height difference or a flaw present at a position overlapping the resist area, as a non-resist area. Accordingly, this configuration enables the resist area to be specified with higher accuracy and thereby enables the more accurate resist area information to be obtained.

Furthermore, the configuration of above Aspect 5 obtains the resist area information, based on the image of the inspection object board that is the inspection target. This causes an area based on the obtained resist area information to more accurately match the actual resist area in the inspection object board and obtains the resist area information optimum for the inspection object board. This configuration accordingly enables the hair inspection for the resist area of the inspection object board as the target to be performed with higher accuracy.

Aspect 6. There is provided a method for hair inspection in a green resist area on a printed circuit board on which solder paste is printed. The method for hair inspection performs an inspection for presence or absence of hair in at least the resist area. The method for hair inspection comprises a color image obtaining process of using a plurality of color lights to obtain a color image with regard to an inspection object board that is the printed circuit board as an inspection target; a hue image obtaining process of obtaining a hue image of the inspection object board from the color image; a saturation image obtaining process of obtaining a saturation image of the inspection object board from the color image; a first hair detection process of detecting first hair including at least one of brown hair and blond hair in at least the resist area of the hue image based on a hue difference of the first hair relative to the resist area; and a second hair detection process of detecting second hair including at least one of black hair and grey hair in at least the resist area of the saturation image based on a saturation difference of the second hair relative to the resist area. The first hair detection process performs a process of detecting the first hair based on only the hue image without a lightness image of the inspection object board, and the second hair detection process performs a process of detecting the second hair based on only the saturation image without the lightness image of the inspection object board.

The configuration of above Aspect 6 has similar functions and advantageous effects to those of Aspect 1 described above.

Aspect 7. The method for hair inspection described in above Aspect 6 may further comprise a resist area information obtaining process of obtaining resist area information that specifies a range occupied by the resist area in the inspection object board. The first hair detection process and the second hair detection process may respectively perform the process of detecting the first hair and the process of detecting the second hair with respect to, as the inspection target, the resist area specified by at least the resist area information obtained in the resist area information obtaining process.

The configuration of above Aspect 7 has similar functions and advantageous effects to those of Aspect 2 described above.

BRIEF DESCRIPTION OF DRAWINGS

FIG. 5 is a block diagram illustrating the functional configuration of the post-solder printing inspection device;

FIG. 6 is a diagram illustrating a color circle of an HSV color space in a simplified manner;

DETAILED DESCRIPTION OF EMBODIMENTS

The following describes embodiments with reference to drawings. The configuration of a printed circuit board 1 is described first.

Figure 1:
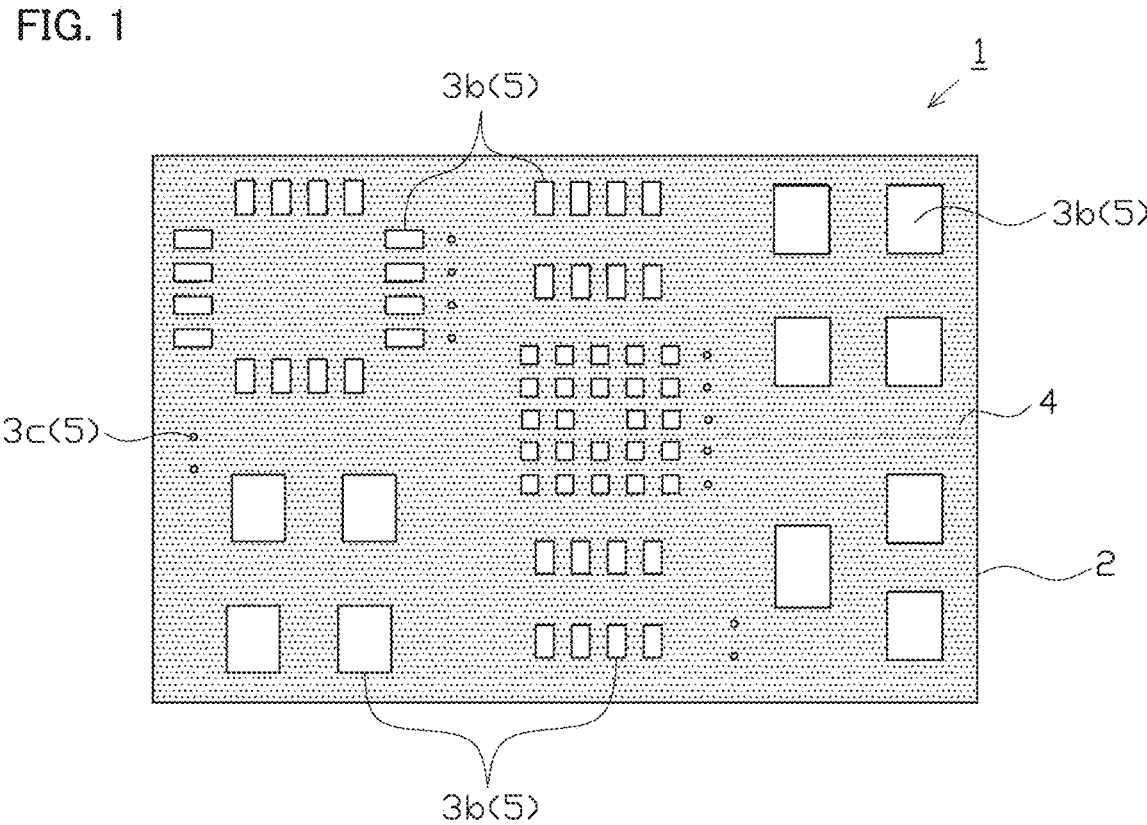
FIG. 1 is a schematic plan view illustrating the schematic configuration of a printed circuit board.
Figure 2:
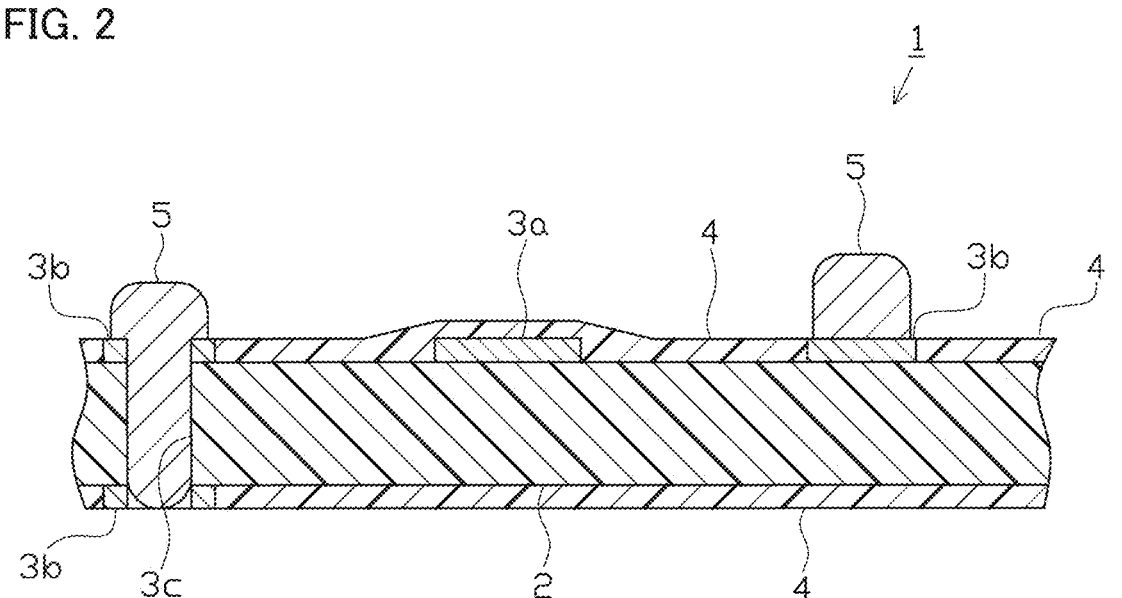
FIG. 2 is a partly enlarged sectional view illustrating the printed circuit board.

As shown in FIG. 1 and FIG. 2, the printed circuit board 1 is configured by, for example, forming a circuit pattern 3a and lands 3b made of copper foil on a base board 2 in a flat plate-like shape made of, for example, a glass epoxy resin and forming through holes 3c pierced through the lands 3b provided on a surface and a rear face of the base board 2. Solder paste 5 obtained by kneading solder particles with flux is printed on the lands 3b and in the through holes 3c. For example, electrode portions of a non-illustrated predetermined component (for example, an electronic component) are electrically connected with the lands 3b via the solder paste 5.

A green resist area 4 (an area filled with a dotted pattern in FIG. 1) is provided in a location other than the lands 3b on the surface of the base board 2. The resist area 4 is made of an insulating resist and serves to coat the base board 2 and the circuit pattern 3a. Height differences caused by, for example, the circuit pattern 3a may be present on an upper face of the resist area 4 and under the resist area 4.

Figure 3:
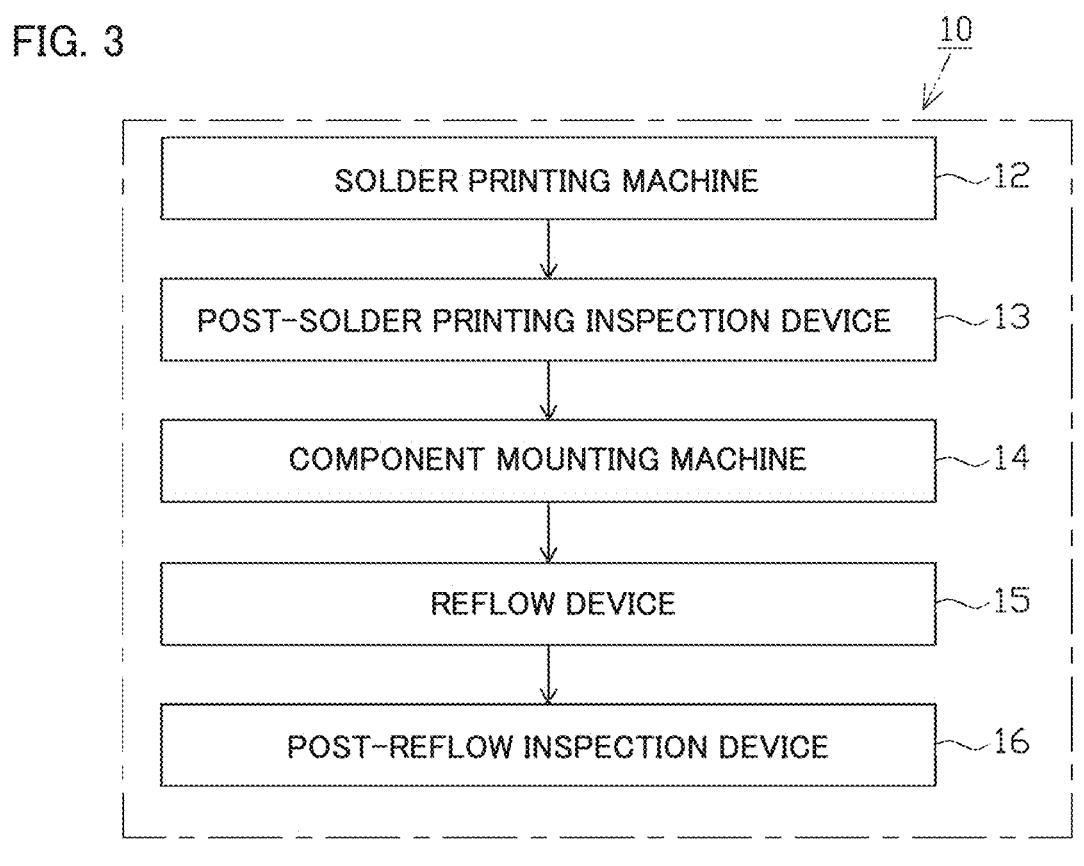
FIG. 3 is a block diagram illustrating the configuration of a manufacturing line of the printed circuit board.

The following describes a manufacturing line (manufacturing process) of manufacturing the printed circuit board 1 with reference to FIG. 3. As shown in FIG. 3, in a manufacturing line 10, a solder printing machine 12, a post-solder printing inspection device 13, a component mounting machine 14, a reflow device 15, and a post-reflow inspection device 16 are placed sequentially from an upstream side thereof (from an upper side of FIG. 3). The printed circuit board 1 is set to be transferred in this sequence along these devices. According to one or more embodiments, the post-solder printing inspection device 13 configures the "apparatus for inspection of hair on a board".

The solder printing device 12 performs a solder printing process of printing the solder paste 5 on, for example, the respective lands 3 of the printed circuit board 1. For example, the solder paste 5 is printed by screen printing. A procedure of screen printing first supplies the solder paste 5 onto an upper face of a screen mask in the state that a lower face of the screen mask is brought into contact with the printed circuit board 1. A plurality of openings corresponding to the respective lands 3b of the printed circuit board 1 are formed in the screen mask. The procedure subsequently brings a predetermined squeegee into contact with the upper face of the screen mask and moves the squeegee to fill inside of the openings with the solder paste 5. The procedure then separates the printed circuit board 1 from the lower face of the screen mask, so that the solder paste 5 is printed on the respective lands 3 and is filled in the through holes 3c.

The post-solder printing inspection device 13 performs a post-solder printing inspection process that performs an inspection for the state of the printed solder paste 5 and for the presence or the absence of any foreign substance on the printed circuit board 1 with the solder paste 5 printed thereon. The post-solder printing inspection process also performs an inspection for the presence or the absence of any hair in at least the resist area 4 with regard to the printed circuit board 1 with the solder paste 5 printed thereon. The post-solder printing inspection device 13 will be described later more in detail.

The component mounting machine 14 performs a component mounting process (mounting process) of mounting the component described above, for example, on the lands 3 with the solder pastes 5 printed thereon. This causes each of the electrode portions of the component to be temporarily fixed to each predetermined solder paste 5.

The reflow device 15 performs a reflow process of heating and melting the solder paste 5 and solder-joining (soldering) the lands 3 with the electrodes of the component.

The post-reflow inspection device 16 performs a post-reflow inspection process of examining whether the solder-joining is performed appropriately in the reflow process. For example, the post-reflow inspection device 16 examiners whether there is any positional misalignment of the component by using image data or the like of the printed circuit board 1 after the reflow process.

Accordingly, the manufacturing line 10 performs the solder printing process, the post-solder printing inspection process, the component mounting process (the mounting process), the reflow process and the post-reflow inspection process in this sequence, while sequentially transferring the printed circuit board 1.

The manufacturing line 10 further includes conveyors or the like provided between the respective devices described above, for example, between the solder printing machine 12 and the post-solder printing inspection device 13 to transfer the printed circuit board 1, although the illustration is omitted. Furthermore, branching units are provided between the post-solder printing inspection device 13 and the component mounting machine 14 and on the downstream side of the post-reflow inspection device 16. The printed circuit board 1 determined as non-defective by the post-solder printing inspection device 13 and by the post-reflow inspection device 16 is guided to downstream, whereas the printed circuit board 1 determined as defective by the post-solder printing inspection device 13 or by the post-reflow inspection device 16 is discharged by the branching unit to a defective storage part (not shown).

Figure 4:
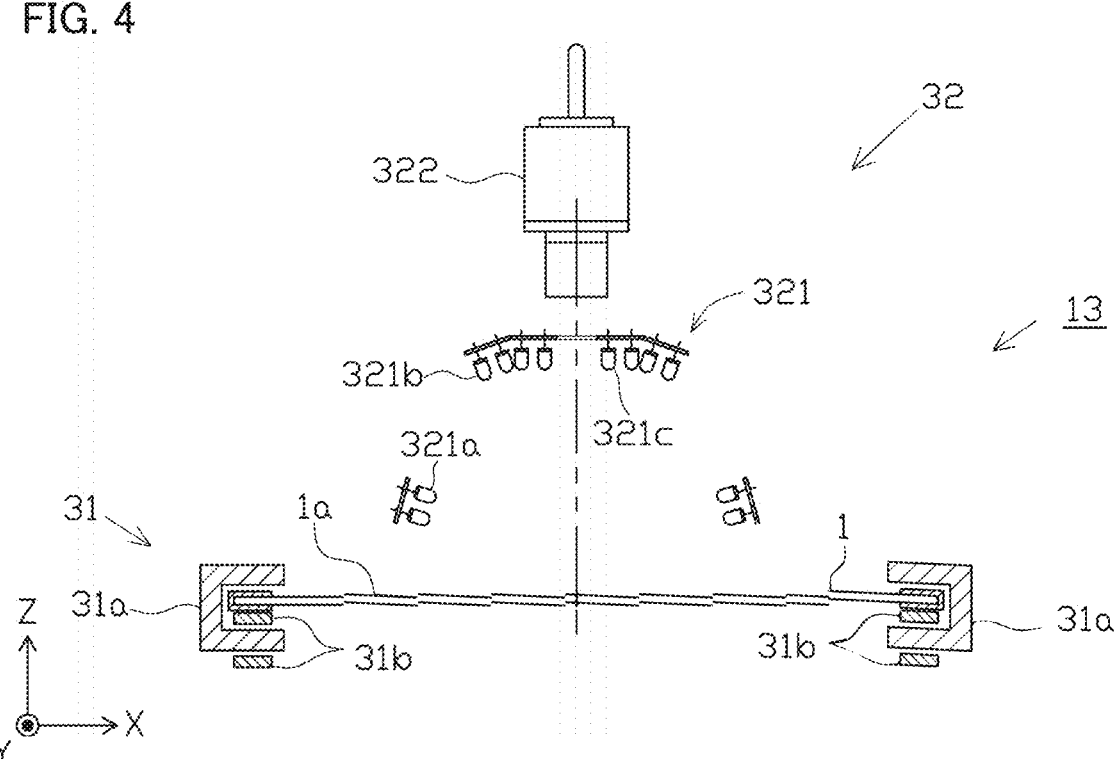
FIG. 4 is a schematic configuration diagram schematically illustrating a post-solder printing inspection device.

The following describes the configuration of the post-solder printing inspection device 13. As shown in FIG. 4 and FIG. 5, the post-solder printing inspection device 13 includes s a transfer mechanism 31 configured to perform transfer, positioning and the like of the printed circuit board 1, an inspection unit 32 configured to perform an inspection of the printed circuit board 1, and a control device 33 configured to perform drive control of the transfer mechanism 31 and the inspection unit 32, as well as various controls, image processing and arithmetic processing in the post-solder printing inspection device 13.

The transfer mechanism 31 includes a pair of transfer rails 31a arranged along a carrying in/out direction of the printed circuit board 1, and an endless conveyor belt 31b placed to be rotatable relative to the respective transfer rails 31a. The transfer mechanism 31 also includes a driving unit, such as a motor, configured to drive the conveyor belt 31b, and a chuck mechanism configured to position the printed circuit board 1 at a predetermined position, although their illustration is omitted. The transfer mechanism 31 is driven and controlled by the control device 33 (a transfer mechanism controller 341 described later).

Under the configuration described above, when the printed circuit board 1 is carried into the post-solder printing inspection device 13, respective side edges of the printed circuit board 1 in a width direction perpendicular to the carrying in/out direction of the printed circuit board 1 are inserted into the transfer rails 31a, and the printed circuit board 1 is placed on the conveyor belt 31b. The conveyor belt 31b subsequently starts operation to transfer the printed circuit board 1 to a predetermined inspection position. When the printed circuit board 1 reaches the inspection position, the conveyor belt 31 stops and the chuck mechanism starts operation. The operation of this chuck mechanism presses up the conveyor belt 31b and causes the respective side edges of the printed circuit board 1 to be clamped by the conveyor belt 31b and upper sides of the transfer rails 31a. This positions and fixes the printed circuit board 1 at the inspection position. When the inspection is terminated, the fixation by the chuck mechanism is released, and the conveyor belt 31b starts operation. This carries out the printed circuit board 1 from the post-solder printing inspection device 13. The configuration of the transfer mechanism 31 is, however, not limited to this configuration described above, but another configuration may be employed for the transfer mechanism 31.

The inspection unit 32 is placed above the transfer rails 31a (above a transfer path of the printed circuit board 1). The inspection unit 32 includes an illumination device 321 and a camera 322. The inspection unit 32 also includes an X-axis moving mechanism 323 configured to allow for motion in an X-axis direction (left-right direction in FIG. 4) and a Y-axis moving mechanism 324 configured to allow for motion in a Y-axis direction (front-rear direction in FIG. 4). The respective moving mechanisms 323 and 324 are driven and controlled by the control device 33 (a moving mechanism controller 340 described later). According to one or more embodiments, the illumination device 321 and the camera 322 configure the "color image obtaining unit".

The illumination device 321 is configured to irradiate the printed circuit board 1, which is an inspection object of the post-solder printing inspection device 13, (hereinafter referred to as "inspection object board 1a") with predetermined light. More specifically, the illumination device 321 includes a first ring light 321a, a second ring light 321b and a third ring light 321c (as shown in FIG. 4).

The first ring light 321a is configured to irradiate the inspection object board 1a with light emitted in an approximately horizontal direction. The second ring light 321b is placed above the first ring light 321a and is configured to irradiate the inspection object board 1a with light emitted obliquely downward. The third ring light 321c is placed on an inner side of the second ring light 321b and is configured to irradiate the inspection object board 1a with light emitted almost vertically downward.

Each of the ring lights 321a, 321b and 321c radiates white light to the inspection object board 1a. More specifically, each of the ring lights 321a, 321b and 321c radiates a plurality of color lights, i.e., red light, blue light and green light, at a time to the inspection object board 1a.

The camera 322 is placed such that an optical axis thereof is along a vertical direction (Z-axis direction) and is configured to take an image of a predetermined inspection object area of the inspection object board 1*a* from immediate above. The "inspection object area" of the inspection object board 1*a* is one area among a plurality of areas set in advance in the inspection object board 1*a* with the size of an imaging visual field (imaging range) of the camera 322 as one unit.

The camera 322 is configured by a color camera and is operated and controlled by the control device 33 (a camera controller 333 described later). The operation control of the control device 33 (the camera controller 333) causes the camera 322 to take an image of reflected light from the inspection object board 1*a* in the state that the inspection object board 1*a* is irradiated simultaneously with lights emitted from the respective ring lights 321*a*, 321*b* and 321*c*. This provides a color image with regard to the inspection object area of the inspection object board 1*a*. This color image includes at least an image of the resist area 4. This color image has a large number of pixels, and three different types of parameter values with regard to R (red), G (green) and B (blue) are set corresponding to each of the pixels. According to one or more embodiments, these parameter values are expressed in the range of 0 to 1.

The color image taken and obtained by the camera 322 is transferred to the control device 33 (a color image capture module 334 described later). The control device 33 then performs an inspection process, based on this color image. According to one or more embodiments, a process of obtaining a color image by using the camera 322 in the state that the inspection object board 1*a* is irradiated by the illumination device 321 corresponds to the "color image obtaining process".

The control device 33 is configured by a computer including a CPU (Central Processing Unit) configured to perform predetermined arithmetic operations, a ROM (Read Only memory) configured to store various programs, fixed value data and the like, a RAM (Random Access Memory) configured to temporarily store various data in the course of various arithmetic operations, and peripheral circuits thereof.

The operations of the CPU according to the various programs cause the control device 33 to serve as various function modules including a main controller 331, an illumination controller 332, a camera controller 333, a color image capture module 334, a hue image obtaining module, 335, a saturation image obtaining module 336, a resist area information obtaining module 337, a first hair detection module 338, a second hair detection module 339, a moving mechanism controller 340 and a transfer mechanism controller 341. According to one or more embodiments, the hue image obtaining module 335 configures the "hue image obtaining unit". Similarly, the saturation image obtaining module 336 configures the "saturation image obtaining unit"; the resist area information obtaining module 337 configures the "resist area information obtaining unit"; the first hair detection module 338 configures the "first hair detection unit"; and the second hair detection module 339 configures the "second hair detection unit".

The various function modules described above are implemented by cooperation of the various hardware components, such as the CPU, the ROM, and the RAM, described above. There is no need to distinctively discriminate the functions implemented by the hardware configuration from the functions implemented by the software configuration. Part or the entirety of these functions may thus be implemented by a hardware circuit, such as an IC. The control device 33 also includes a function module configured to make an inspection for the state of the solder paste 5 and for the presence or the absence of any foreign substance in the printed circuit board 1. This function module is, however, omitted from the configuration of the embodiments.

Furthermore, the control device 33 is provided with, for example, an input unit 342 configured by, for example, a keyboard and a mouse, a touch panel or the like, a display unit 343 provided with a display screen and configured by, for example, a liquid crystal display or the like, a storage unit 344 configured to store various data and programs, results of arithmetic operations, results of inspection and the like, and a communication unit 345 configured to send and receive various data to and from outside. The storage unit 344 and the communication unit 345 are described first.

The storage unit 344 is configured by, for example, an HDD (Hard Disk Drive), an SSD (Solid State Drive) or the like to store various pieces of information. The storage unit 344 includes an image storage portion 344*a*, an inspection information storage portion 344*b*, a resist area information storage portion 344*c* and an inspection results storage portion 344*d*.

The image storage portion 344*a* stores color images taken and obtained by the camera 322. The image storage portion 344*a* also stores, for example, hue images and saturation images respectively obtained by the hue image obtaining module 335 and the saturation image obtaining module 336 as described later. The color images, the hue images, the saturation images and the like stored in the image storage portion 344*a* may be displayed appropriately on the display unit 343.

The inspection information storage portion 344*b* stores various pieces of information that are used for an inspection of the inspection object board 1*a*. For example, the inspection information storage portion 344*b* stores, for example, a threshold value (a hue threshold value) used for processing a hue image by a binarization process, a threshold value (a saturation threshold value) used for processing a saturation image by the binarization process, and a reference value (an area specifying reference value) used for determining whether a part is the resist area 4 or not. The inspection information storage portion 344*b* also stores an area threshold value and length threshold values used for determining whether a detected object is hair or not.

The resist area information storage portion 344*c* stores resist area information obtained by the resist area information obtaining module 337.

The inspection results storage portion 344*d* stores inspection results data by the hair detection modules 338 and 339. The inspection results storage portion 344*d* also stores inspection results data with regard to the state of the solder paste 5 and with regard to the presence or the absence of any foreign substance in the printed circuit board 1, as well as statistical data obtained by processing various inspection results data stochastically. These inspection results data and statistical data may be displayed appropriately on the display unit 343.

The communication unit 345 is provided with, for example, wireless communication interfaces in conformity with communication standards such as wired LAN (Local Area Network) and wireless LAN and are configured to send and receive various data to and from outside. For example, the results of inspection performed by the hair detection modules 338 and 339 are output to the outside via the communication unit 345, and the results of inspection performed by the post-reflow inspection device 16 are input via the communication unit 345.

The following describes the above various function modules configuring the control device 33 in detail. The moving mechanism controller 340 and the transfer mechanism controller 341 are described first, and the main controller 331 and the others are described next.

The moving mechanism controller 340 is a function module configured to drive and control the X-axis moving mechanism 323 and the Y-axis moving mechanism 324 and serves to control the position of the inspection unit 32, in response to a command signal from the main controller 331. The moving mechanism controller 340 drives and controls the X-axis moving mechanism 323 and the Y-axis moving mechanism 324 to move the inspection unit 32 to a position above an arbitrary inspection object area on the inspection object board 1*a* positioned and fixed at an inspection position. The configuration of successively moving the inspection unit 32 to a plurality of inspection object areas set on the inspection object board 1*a* and performing inspections with regard to the respective inspection object areas completes inspection of the entire area of the inspection object board 1*a*.

The transfer mechanism controller 341 is a function module configured to drive and control the transfer mechanism 31 and serves to control the transfer position of the inspection object board 1*a*, in response to a command signal from the main controller 331.

The following describes the main controller 331 and the others. The main controller 331 is a function module responsible for the control of the entire post-solder printing inspection device 13 and is configured to send and receive various signals to and from other function modules such as the illumination controller 332 and the camera controller 333.

The illumination controller 332 is a function module configured to drive and control the illumination device 321. The illumination controller 332 performs, for example, timing control with regard to irradiation and stop of irradiation of the inspection object board 1*a* with the light emitted from the illumination device 321, in response to a command signal from the main controller 331.

The camera controller 333 is a function module configured to drive and control the camera 322. The camera controller 333 controls, for example, the imaging timing of the inspection object board 1*a* by the camera 322, in response to a command signal from the main controller 331.

The color image capture module 334 is a function module configured to capture the color image taken and obtained by the camera 322. The color image captured by the camera image capture module 334 is stored into the image storage portion 344*a*.

Figure 6:
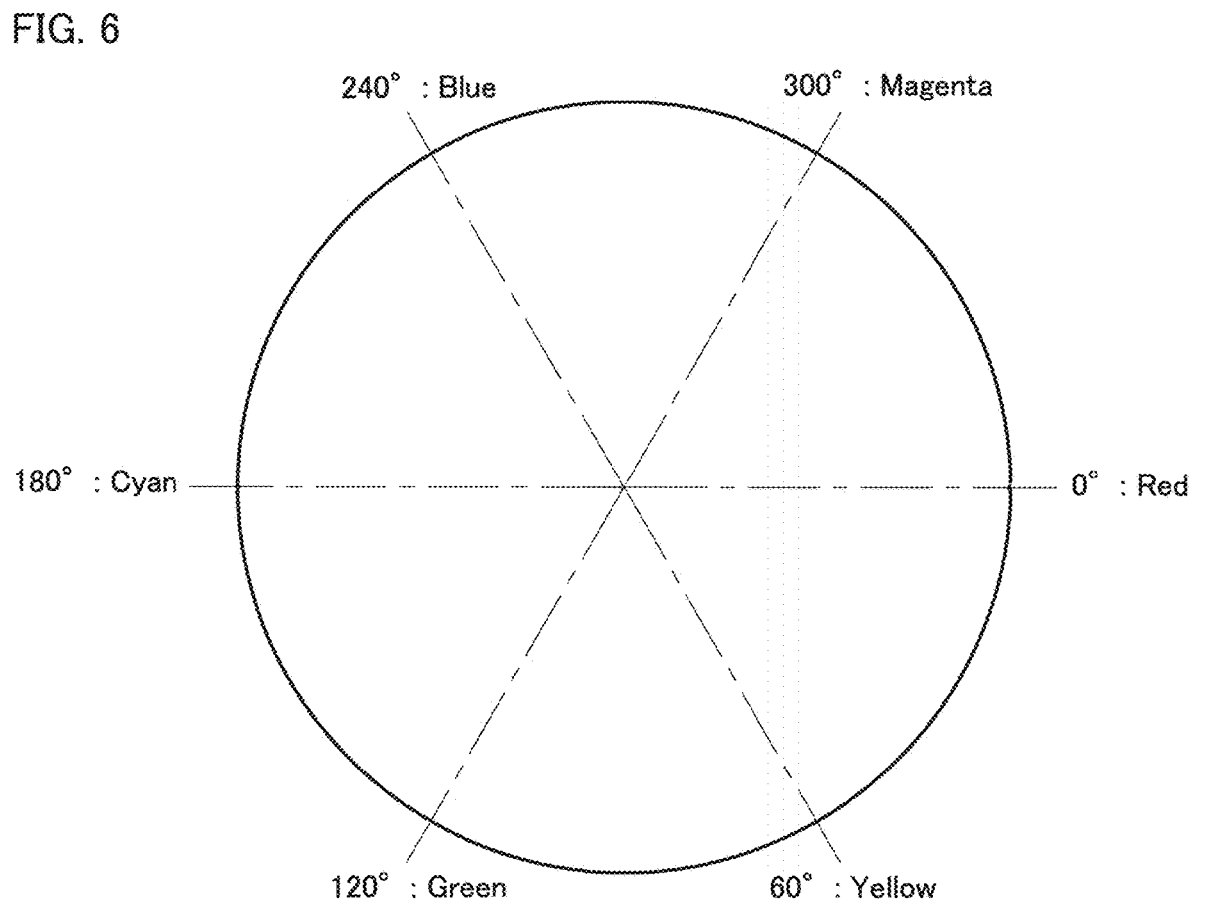
Figure 7:
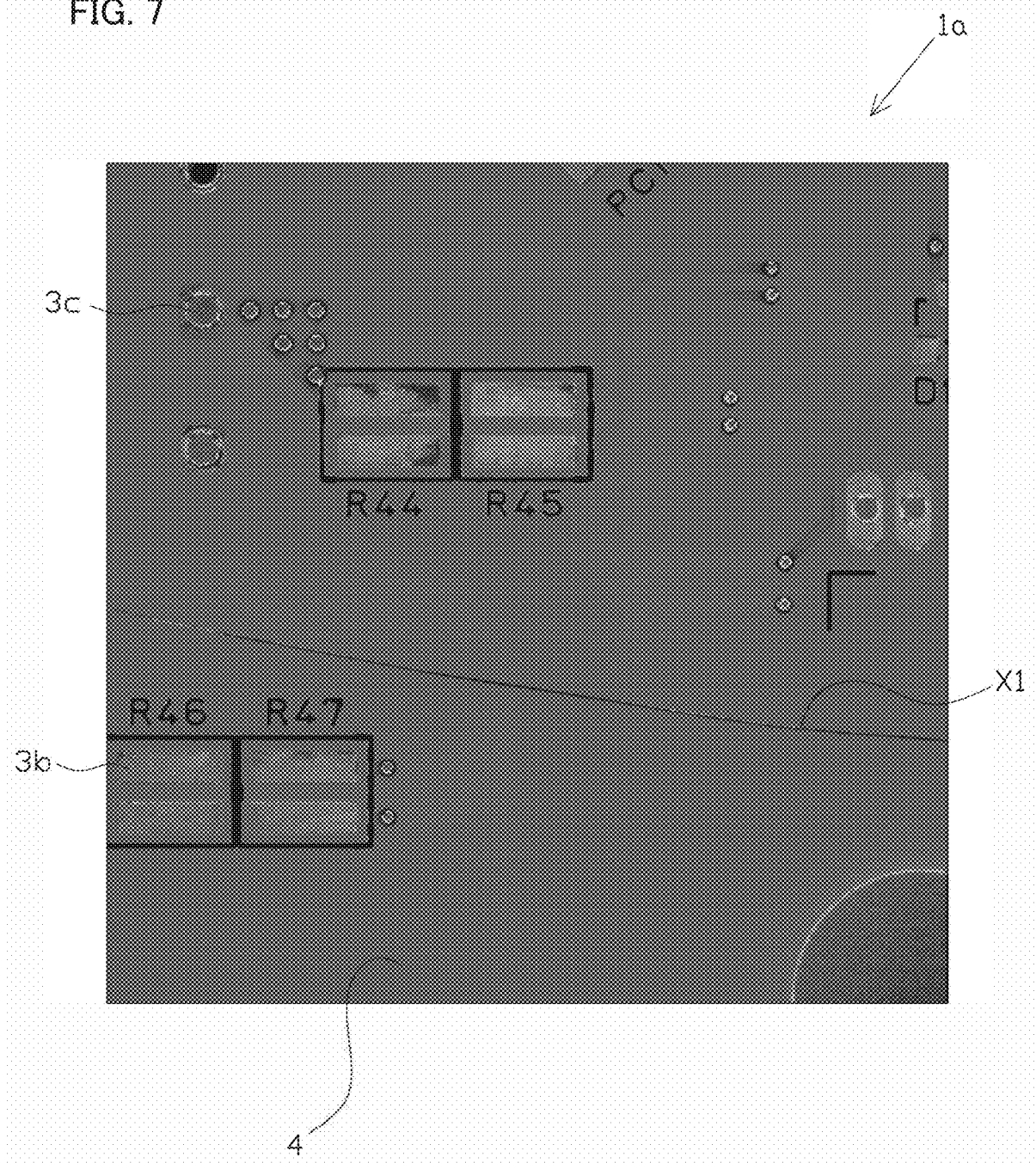
FIG. 7 is a diagram illustrating a hue image of an inspection object board with blond hair adhering thereto.
Figure 8:
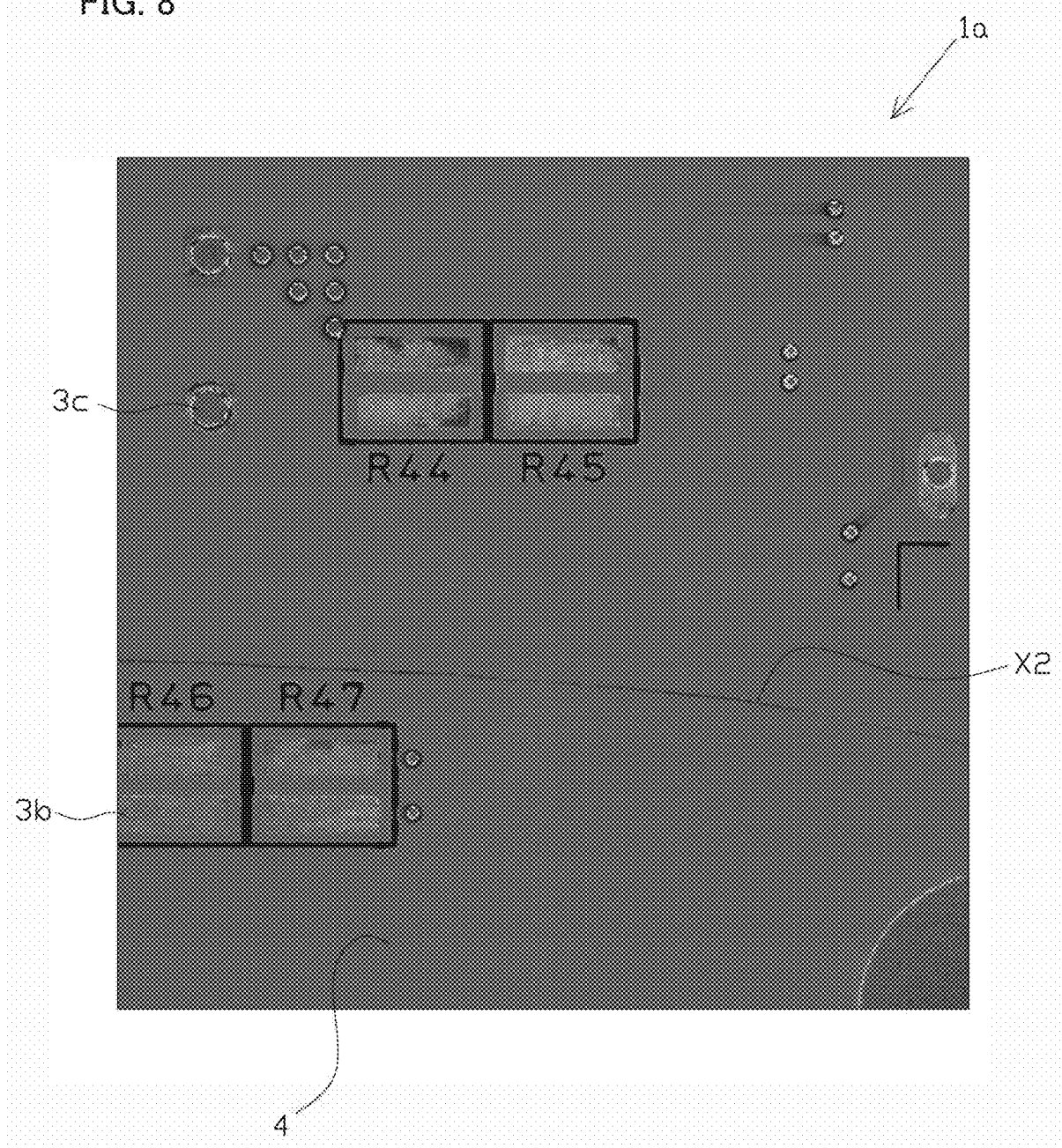
FIG. 8 is a diagram illustrating a hue image of the inspection object board with brown hair adhering thereto.

The hue image obtaining module 335 uses the color image with regard to the inspection object area of the inspection object board 1*a* stored in the image storage portion 344*a* to obtain a hue image with regard to the inspection object area of the inspection object board 1*a*. The hue image is an image indicating hues in a color circle of an HSV color space with regard to respective pixels in the color image. FIG. 7 and FIG. 8 show examples of hue images. The hue image obtaining module 335 determines hues Hue (hereinafter referred to as "hues H") of the respective pixels in the color circle of the HSV color space (shown in FIG. 6) with 0 degree (360 degrees) as red, 60 degrees as yellow, 120 degrees as (strict) green, 180 degrees as cyan, 240 degrees as blue, and 300 degrees as magenta and obtains a hue image in which hues H are related to respective pixels. According to one or more embodiments, a process of obtaining a hue image of the inspection object board 1*a* by the hue image obtaining module 335 corresponds to the "hue image obtaining process". The hue image is stored in the image storage portion 344*a*.

The hue H is calculated by using Mathematical Expression 1, Mathematical Expression 2 or Mathematical Expression 3 given below. Mathematical Expression 1 is used when a parameter value of B is a maximum value among respective parameter values of R, G and B. Mathematical Expression 2 is used when the parameter value of R is a maximum value among the respective parameter values of R, G and B. Mathematical Expression 3 is used when the parameter value of G is a maximum value among the respective parameter values of R, G and B. In the case where the maximum value and the minimum value out of the respective parameter values of R, G and B are equal to each other, however, no hue H is defined:

$$H=60\times(G-R)/(MAX-MIN)+60 \qquad \text{<Mathematical Expression 1>}$$

$$H=60\times(B-G)/(MAX-MIN)+180 \qquad \text{<Mathematical Expression 2>}$$

$$H=60\times(R-B)/(MAX-MIN)+300 \qquad \text{<Mathematical Expression 3>}$$

In Mathematical Expressions 1 to 3, R, G, and B respectively represent the respective parameter values of R, G and B; MAX represents a maximum value out of the respective parameter values; and MIN represents a minimum value out of the respective parameter values.

Figure 9:
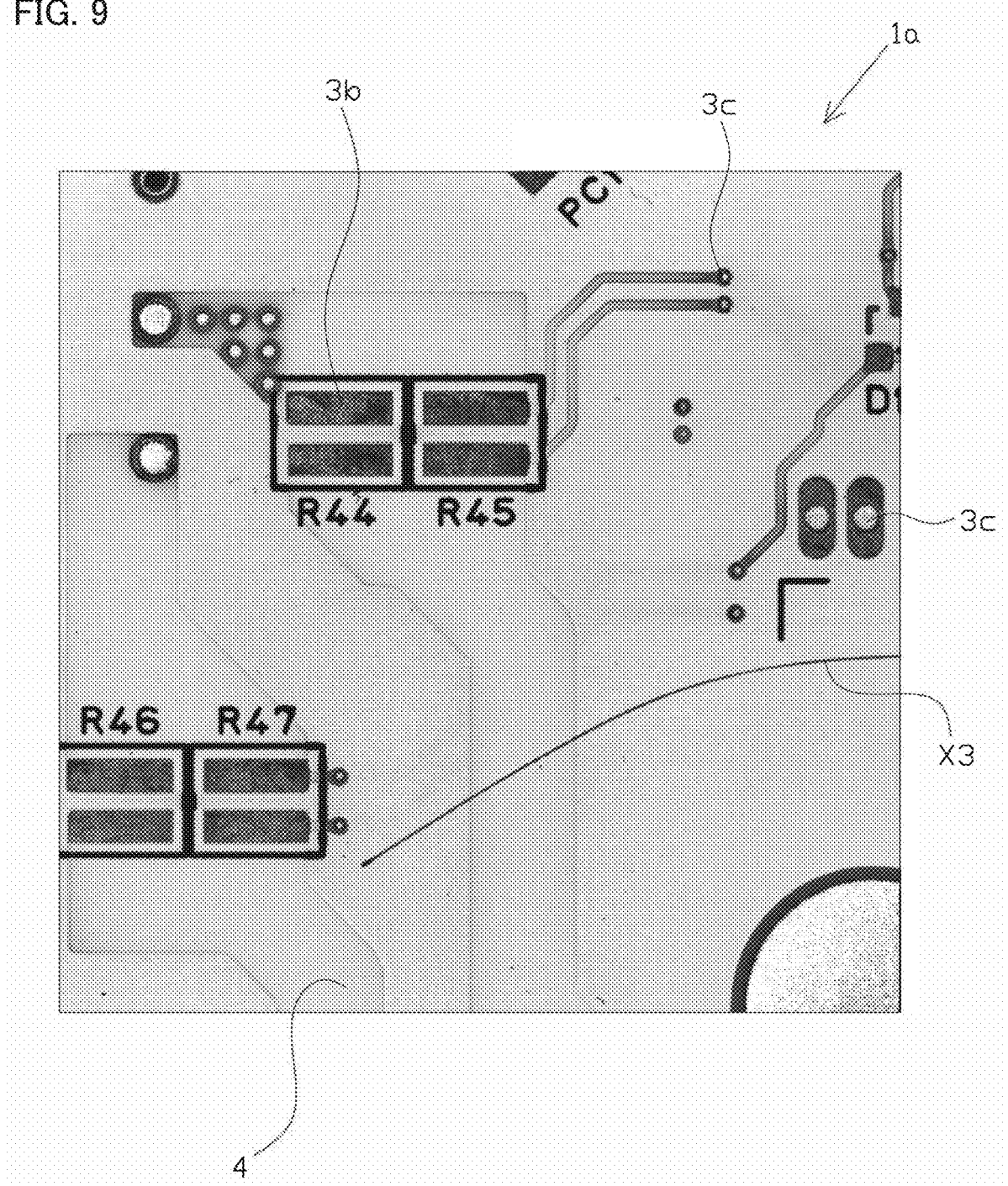
FIG. 9 is a diagram illustrating a saturation image of the inspection object board with black hair adhering thereto.
Figure 10:
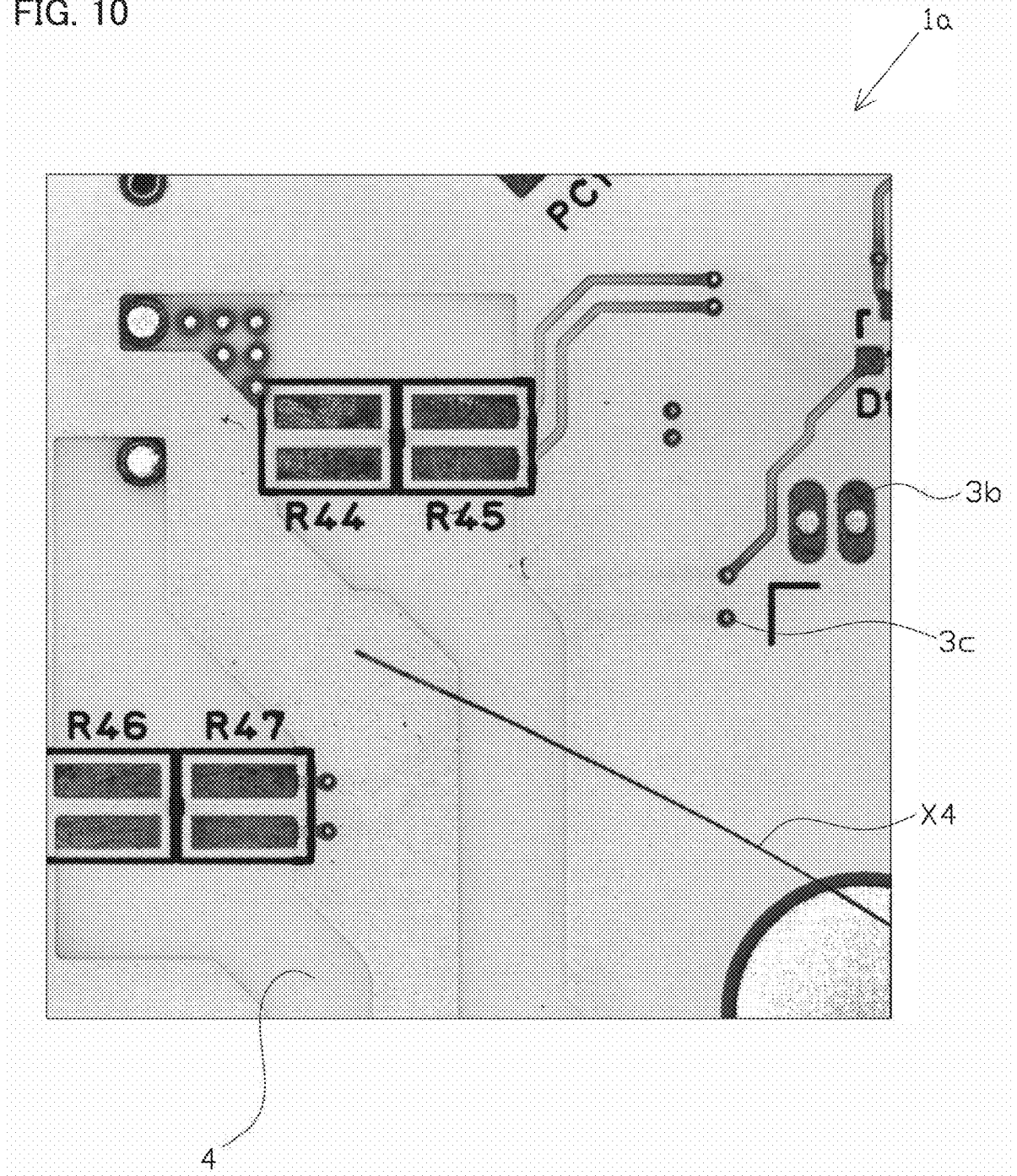
FIG. 10 is a diagram illustrating a saturation image of the inspection object board with gray hair adhering thereto.

The saturation image obtaining module 336 uses the color image with regard to the inspection object area of the inspection object board 1*a* stored in the image storage portion 344*a* to obtain a saturation image with regard to the inspection object area of the inspection object board 1*a*. The saturation image is an image indicating saturations of respective pixels in the color image. FIG. 9 and FIG. 10 show examples of saturation images. The saturation image obtaining module 336 uses Mathematical Expression 4 given below to calculate saturations S (saturations in the HSV system) of the respective pixels in the color image and obtains a saturation image in which saturations S are related to respective pixels. According to one or more embodiments, a process of obtaining a saturation image of the inspection object board 1*a* by the saturation image obtaining module 336 corresponds to the "saturation image obtaining process". The saturation image is stored in the image storage portion 344*a*:

$$S=(1-3\times MIN/(R+G+B)) \qquad \text{<Mathematical Expression 4>}$$

Like Mathematical Expressions 1 to 3, in Mathematical Expression 4, R, G, and B respectively represent the respective parameter values of R, G and B; and MIN represents a minimum value out of the respective parameter values. The saturations S of the respective pixels in the saturation image are expressed by the values of 0 to 1. The saturation S of a pixel closer to 1 indicates that the color of the pixel is closer to the primary color. The saturations S may be determined according to Mathematical Expression 4a given below, in place of Mathematical Expression 4:

$$S=(MAX-MIN)/MAX \qquad \text{<Mathematical Expression 4a>}$$

The resist area information obtaining module 337 obtains resist area information in order to specify a range occupied by the resist area 4 in the inspection object board 1*a*. According to one or more embodiments, the resist area information obtaining module 337 obtains resist area information, based on the printed circuit board 1 of an inspection object, i.e., the inspection object board 1*a*.

More specifically, the resist area information obtaining module 337 obtains a hue image similar to the hue image described above, based on the color image. The hue image obtained by the hue image obtaining module 335 may be used here.

The resist area information obtaining module 337 subsequently performs a process of specifying linkage component of pixels in the hue image that have the hues H in a predetermined range (for example, not less than 70 degrees and not greater than 160 degrees according to one or more embodiments) and calculates an area (the number of pixels according to one or more embodiments) of the specified linkage components (lump part). Accordingly, the resist area information obtaining module 337 calculates the area of a lump part that has green color or colors close to green in the color image.

The resist area information obtaining module 337 subsequently compares the area of the lump part with the area specifying reference value stored in advance in the inspection information storage portion 344*b* and determines that the lump part having the area greater than the area specifying reference value is the resist area 4. The resist area information obtaining module 337 then obtains information for specifying this resist area 4 (for example, coordinate information indicating the position of the resist area 4), as resist area information. The obtained resist area information is stored in the resist area information storage portion 344*c*. According to one or more embodiments, a process of obtaining the resist area information by the resist area information obtaining module 337 corresponds to the "resist area information obtaining process".

The first hair detection module 338 utilizes a hue difference relative to the resist area 4 to detect hair including at least brown hair and blond hair, as first hair, in at least the resist area 4 of the hue image obtained by the hue image obtaining module 335. A procedure of detecting the first hair is described in detail below.

The first hair detection module 338 first obtains a binarized hue image by binarizing the respective pixels of the hue image in relation to a hue component. According to one or more embodiments, the binarized hue image is obtained by comparing the hue threshold value stored in advance in the inspection information storage portion 344*b* with the hues H of the respective pixels in the hue image and binarizing the respective pixels in the hue image. The obtained binarized hue image is a black and white image including 0 (light portion) and 1 (dark portion). The binarized hue image is stored in the image storage portion 344*a*.

A hue image with regard to the inspection object board 1*a* with a blond hair X1 adhering thereto (refer to FIG. 7) and a hue image with regard to the inspection object board 1*a* with a brown hair X2 adhering thereto (refer to FIG. 8) are shown for the purpose of reference. As shown in these drawings, in the hue images, the respective hues of the blond hair X1 and the brown hair X2 are sufficiently different from the hue of the resist area 4 for the purpose of an inspection. Accordingly, in the binarized hue images, for example, the blond hair X1 and the brown hair X2 are shown as dark portions and the resist area 4 is shown as a light portion.

After obtaining the binarized hue image, the first hair detection module 338 sets the resist area 4 specified at least according to the resist area information obtained by the resist area information obtaining module 337, in this binarized hue image, as an inspection target (inspection range). This excludes, for example, the lands 3*b*, the through holes 3*c*, and a letter or character part and a graphic part applied on the inspection object board 1*a*, from the inspection target (inspection range). According to one or more embodiments, the resist area information and the hue image are obtained, based on an identical inspection object board 1*a*, so that an optimum inspection target is set for this inspection object board 1*a*.

The first hair detection module 338 subsequently performs a process of specifying a linkage component of pixels (for example, dark portions) having hues different from the hue of the resist area 4 (for example, light portion), in the inspection target (inspection range) and calculates an area (for example, the number of pixels) of the specified linkage component (lump part). The first hair detection module 338 also calculates lengths (for example, an X-direction length and a Y-direction length) of the linkage component (lump part).

The first hair detection module 338 subsequently compares the area of the lump part with the area threshold value stored in advance in the inspection information storage portion 344*b*. When the area of the lump part is greater than the area threshold value, the first hair detection module 338 determines that the first hair is present in the resist area 4 and accordingly determines that the inspection object area in the inspection object board 1*a* is "defective".

The first hair detection module 338 also compares the lengths of the lump part with the length threshold values stored in advance in the inspection information storage portion 344*b*. When the length of the lump part is greater than the length threshold value, the first hair detection module 338 determines that the first hair is present in the resist area 4 and accordingly determines that the inspection object area in the inspection object board 1*a* is "defective".

When the area of the lump part is greater than the area threshold value and the length of the lump part is greater than the length threshold value, the first hair detection module 338 may determine that the first hair is present in the resist area 4. A parameter other than the area and the lengths (for example, a thickness or a shape) may be used to determine the presence or the absence of the first hair.

When the area of the lump part is not greater than the area threshold value and the lengths of the lump part are not greater than the length threshold values, on the other hand, the first hair detection module 338 determines that the first hair is not present in the resist area 4. The first hair detection module 338 accordingly determines that the inspection object area in the inspection object board 1*a* is "nondefective". According to one or more embodiments, a process of detecting the first hair by the first hair detection module 338 corresponds to the "first hair detection process".

The first hair detection module 338 performs the inspection process described above for the presence or the absence of the first hair with regard to all the inspection object areas of the inspection object board 1*a* as the target. More specifically, the first hair detection module 338 performs the above inspection process by using all the hue images with regard to the inspection object board 1*a*. The results of the inspection with regard to the first hair in all the inspection object areas are stored in the inspection results storage portion 344*d*. As described above, the first hair detection module 338 performs the process of detecting the first hair, based on only the hue images of the inspection object board 1*a*, without using lightness images of the inspection object board 1*a* (images indicating the lightness values of the respective pixels in the inspection object board 1*a*).

The second hair detection module 339 utilizes a saturation difference relative to the resist area 4 to detect hair including at least black hair and gray hair, as second hair, in at least the resist area 4 of the saturation image obtained by the saturation image obtaining module 336. A procedure of detecting the second hair is described in detail below.

The second hair detection module 339 first obtains a binarized saturation image by binarizing the respective pixels of the saturation image in relation to a saturation component. According to one or more embodiments, the binarized saturation image is obtained by comparing the threshold value for obtaining the saturation image stored in advance in the inspection information storage portion 344*b* with the saturations S of the respective pixels in the saturation image and binarizing the respective pixels in the saturation image. The obtained binarized saturation image is a black and white image including 0 (dark portion) and 1 (light portion). The binarized saturation image is stored in the image storage portion 344*a*.

A saturation image with regard to the inspection object board 1*a* with a black hair X3 adhering thereto (refer to FIG. 9) and a saturation image with regard to the inspection object board 1*a* with a gray hair X4 adhering thereto (refer to FIG. 10) are shown for the purpose of reference. As shown in these drawings, in the saturation images, the respective saturations of the black hair X3 and the gray hair X4 are sufficiently different from the saturation of the resist area 4 for the purpose of an inspection. Accordingly, in the binarized saturation images, for example, the black hair X3 and the gray hair X4 are shown as dark portions and the resist area 4 is shown as a light portion.

After obtaining the binarized saturation image, the second hair detection module 339 sets the resist area 4 specified at least according to the resist area information obtained by the resist area information obtaining module 337, in this binarized saturation image, as an inspection target (inspection range).

The second hair detection module 339 subsequently performs a process of specifying a linkage component of pixels (for example, dark portions) having different saturations from the saturation of the resist area 4 (for example, light portion) in the inspection target (inspection range) and calculates an area and lengths of the specified linkage component (lump part).

The second hair detection module 339 then compares the area of the lump part with the area threshold value described above and, when the area of the lump part is greater than the area threshold value, determines that the second hair is present in the resist area 4. The second hair detection module 339 also compares the lengths of the lump part with the length threshold values described above and, when the length of the lump part is greater than the length threshold value, determines that the second hair is present in the resist area 4. When it is determined that the second hair is present in the resist area 4, the second hair detection module 339 determines that the inspection object area in the inspection object board 1*a* is "defective".

When the area of the lump part is greater than the area threshold value and the length of the lump part is greater than the length threshold value, the second hair detection module 339 may determine that the second hair is present in the resist area 4. A parameter other than the area and the lengths (for example, a thickness or a shape) may be used to determine the presence or the absence of the second hair.

When the area of the lump part is not greater than the area threshold value and the lengths of the lump part are not greater than the length threshold values, on the other hand, the second hair detection module 339 determines that the second hair is not present in the resist area 4 and accordingly determines that the inspection object area in the inspection object board 1*a* is "non-defective". According to one or more embodiments, a process of detecting the second hair by the second hair detection module 339 corresponds to the "second hair detection process".

The second hair detection module 339 performs the inspection process described above for the presence or the absence of the second hair with regard to all the inspection object areas of the inspection object board 1*a* as the target. More specifically, the second hair detection module 339 performs the above inspection process by using all the saturation images with regard to the inspection object board 1*a*. The results of the inspection with regard to the second hair in all the inspection object areas are stored in the inspection results storage portion 344*d*. As described above, the second hair detection module 339 performs the process of detecting the second hair, based on only the saturation images of the inspection object board 1*a*, without using the lightness images of the inspection object board 1*a*.

When it is determined that all the inspection object areas are "non-defective" as the results of the inspection for the presence or the absence of the first hair and the second hair with regard to all the inspection object areas in the inspection object board 1*a*, the post-solder printing inspection device 13 (the main controller 331) determines that no hair is present in the resist area 4 of the inspection object board 1*a* and stores this determination result in the inspection results storage portion 344*d*.

When there is any inspection object area determined as "defective", on the other hand, the post-solder printing inspection device 13 determines that there is hair (i.e., a defective location) in the inspection object board 1*a* and stores this determination result in the inspection results storage portion 344*d*. These determination results are also notified to outside via the display unit 343 and the communication unit 345.

As described above in detail, one or more embodiments are configured to detect the hair including at least the brown hair and the blond hair as the first hair in at least the resist area 4 of the hue image by utilizing the hue difference relative to the resist area 4. More specifically, one or more embodiments are configured to focus on especially a difference in hue which the first hair such as the brown hair or the blond hair readily has relative to the green resist area 4 and to detect the first hair by using this hue difference. Accordingly, the configuration of one or more embodiments enables the first hair such as the brown hair or the blond hair located in the resist area 4 to be detected with high accuracy.

One or more embodiments are also configured to detect the hair including at least the black hair and the gray hair as the second hair in at least the resist area 4 of the saturation image by utilizing the saturation difference relative to the resist area 4. More specifically, one or more embodiments are configured to focus on especially a difference in saturation which the second hair such as the black hair or the gray hair readily has relative to the green resist area 4 and to detect the second hair by using this saturation difference. Accordingly, the configuration of one or more embodiments enables the second hair such as the black hair or the gray hair located in the resist area 4 to be detected with high accuracy.

As described above, the configuration of one or more embodiments enables the first hair and the second hair to be detected with high accuracy. More specifically, the configuration of one or more embodiments enables the hair of the common color, such as black hair, gray hair, brown hair or blond hair to be detected with high accuracy.

The configuration of one or more embodiments also performs detection of the respective hairs by utilizing only the hue images and the saturation images without using the lightness images of the inspection object board 1*a*. Accordingly, this configuration more certainly prevents misdetection of the circuit pattern 3*a*, a height difference or a flaw as the hair by using the lightness images. Furthermore, this configuration without using the lightness images reduces the load relating to the inspection processing.

Additionally, the configuration of one or more embodiments prevents misdetection caused by the circuit pattern 3*a*, a height difference or the like as described above and thereby does not require a troublesome process of excluding an area including the circuit pattern 3*a* from an inspection target for the purpose of preventing the misdetection. This more effectively reduces the load of the inspection-related processing and suppresses an increase in cost with regard to the inspection and the speed-up of the inspection.

Furthermore, both the hair detection modules 338 and 339 are configured to detect the first hair and the second hair in the resist area 4 specified by at least the resist area information obtained by the resist area information obtaining module 337, as the inspection target. Accordingly, this configuration allows for selective inspection of the resist area 4 with regard to the presence or the absence of hair. This more certainly avoids a potential risk caused by carbonization of hair located in the resist area 4.

Moreover, the configuration of one or more embodiments extracts an area having the hue identical with the hue of the resist area 4 from the hue image of the inspection object board 1*a*, such as to obtain the resist area information. Accordingly, compared with the configuration of using the lightness image of the inspection object board 1*a*, this configuration more certainly prevents misdetection of a height difference or a flaw present at a position overlapping the resist area 4, as a non-resist area. This enables the resist area 4 to be specified more accurately and thereby enables the more accurate resist area information to be obtained.

Furthermore, the configuration of one or more embodiments obtains the resist area information, based on the images of the inspection object board 1*a* that is an inspection target. This causes an area based on the obtained resist area information to more accurately match the actual resist area 4 in the inspection object board 1*a* and obtains the resist area information optimum for the inspection object board 1*a*. This configuration accordingly enables the hair inspection for the resist area 4 of the inspection object board 1*a* as the target to be performed with higher accuracy.

The present disclosure is not limited to the description of the above embodiments but may be implemented, for example, by configurations described below. The present disclosure may also be naturally implemented by applications and modifications other than those illustrated below.

(a) According to the embodiments described above, the resist area information obtaining module 337 is configured to obtain the resist area information by extracting a location having a hue in a predetermined range in the hue image with regard to the inspection object board 1*a*, as the resist area. According to another embodiment, the resist area information obtaining module 337 may be configured to obtain the resist area information by extracting a location having a saturation in a predetermined range in the saturation image, as the resist area. These two configurations of obtaining the resist area information may be used in combination.

(b) According to the embodiments described above, the resist area information obtaining module 337 is configured to obtain the resist area information, based on the images of the inspection object board 1*a*.

According to another embodiment, the resist area information obtaining module 337 may be configured to obtain the resist area information by at least one of a configuration of using a master color image to obtain a hue image of a master board and extracting an area having a hue substantially equal to the hue of the resist area from the hue image and a configuration of using the master color image to obtain a saturation image of the master board and extracting an area having a saturation substantially equal to the saturation of the resist area from the saturation image. The master color image represents a color image of the master board (not shown) that is an ideal printed circuit board 1. The master color image may be obtained, for example, by using the camera 322 to take an image of a master board that is fed to the post-solder printing inspection device 13 and that is irradiated with the light from the illumination device 321. In this case, the illumination device 321 and the camera 322 configure the "master color image obtaining unit".

The configuration of obtaining the resist area information based on the master color image enables the sufficiently accurate resist area information to be obtained according to the relationship to the inspection object board 1*a* without using design information or manufacture information described below.

This configuration obtains the resist area information by extracting the area having the hue substantially equal to the hue of the resist area from the hue image and/or by extracting the area having the saturation substantially equal to the saturation of the resist area from the saturation image. Compared with a configuration of using a lightness image, this configuration enables the resist area 4 of the master board to be specified with higher accuracy and accordingly enables the more accurate resist area information to be obtained. As a result, this configuration enables an inspection to be performed more appropriately for the resist area 4 of the inspection object board 1*a*.

(c) The resist area information obtaining module 337 may be configured to obtain the resist area information, based on at least one of design information and manufacture information of the printed circuit board 1. One example of the design information is CAD data of the printed circuit board 1, and one example of the manufacture information is Gerber data of the printed circuit board 1.

The modified configuration of using the design information and the manufacture information to obtain the resist area information enables the sufficiently accurate resist area information to be readily obtained according to the relationship to the inspection object board 1*a* even when the printed circuit board 1 or the master board is not at hand.

(d) According to the embodiments described above, the respective ring lights 321*a*, 321*b* and 321*c* are configured to radiate the white light. According to one modification, the respective ring lights 321*a*, 321*b* and 321*c* may be configured to radiate red light, blue light and green light (i.e., different color lights). In this modification, the camera 322 may be configured by a monochromatic camera to take images of the printed circuit board 1, every time the irradiation is performed sequentially from the respective ring lights 321*a*, 321*b* and 321*c*, and to thereby obtain a total of three different types of images. The modified configuration may subsequently obtain hue images and saturation images, based on these three different types of images. In the three different types of images, a parameter value with regard to R (red color), a parameter value with regard to G (green color) and a parameter value with regard to B (blue color) are respectively set for each pixel. Accordingly, these three different types of images correspond to the "color image".

(e) The above embodiments are configured to binarize the hue images and the saturation images and obtain the binarized hue images and the binarized saturation images in the process of detecting the first hair and the second hair. It is, however, not necessary to obtain the binarized images. Accordingly, in one example, one modification may be configured to detect the first hair and the second hair by directly using the hue images and the saturation images. In another example, another modification may be configured to determine the area and the length of a location having a hue in a predetermined range in the hue image or having a saturation in a predetermined range in the saturation image and detect the first hair and the second hair, based on the determined area and length.

(f) The above embodiments are configured to detect both the brown hair and the blond hair, based on the hue images. One modification may be configured to detect one of the brown hair and the blond hair, based on the hue images. In this modification, the first hair indicates hair including only one of the brown hair and the blond hair.

The above embodiments are configured to detect both the black hair and the gray hair, based on the saturation images. One modification may be configured to detect one of the black hair and the grey hair, based on the saturation images. In this modification, the second hair indicates hair including only one of the black hair and the gray hair.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 . . . printed circuit board, 1*a* . . . inspection object board, 4 . . . resist area, 5 . . . solder paste, 13 . . . post-solder printing inspection device (apparatus for hair inspection on substrate), 321 . . . illumination device (color image obtaining unit, master color image obtaining unit), 322 . . . camera (color image obtaining unit, master color image obtaining unit), 335 . . . hue image obtaining module (hue image obtaining unit), 336 . . . saturation image obtaining module (saturation image obtaining unit), 337 . . . resist area information obtaining module (resist area information obtaining unit), 338 . . . first hair detection module (first hair detection unit), 339 . . . second hair detection module (second hair detection unit)

What is claimed is:

1. An apparatus for hair inspection in a green resist area on a printed circuit board on which solder paste is printed, the apparatus comprising:

an inspection unit that obtains, with a plurality of color lights, a color image of an inspection object board that is the printed circuit board as an inspection target; and a control device that:

obtains a hue image of the inspection object board from the color image;

obtains a saturation image of the inspection object board from the color image;

detects first hair including at least one of brown hair and blond hair in at least the resist area of the hue image based on a hue difference of the first hair relative to the resist area; and detects second hair including at least one of black hair and grey hair in at least the resist area of the saturation image based on a saturation difference of the second hair relative to the resist area, wherein the first hair is detected based on only the hue image without a lightness image of the inspection object board, and the second hair is detected based on only the saturation image without the lightness image of the inspection object board.

2. The apparatus for hair inspection according to claim 1, wherein the control device further:

obtains resist area information that specifies a range occupied by the resist area in the inspection object board, and detects the first hair and the second hair with respect to, as the inspection target, the resist area specified by at least the resist area information.

3. The apparatus for hair inspection according to claim 2, wherein the control device obtains the resist area information based on at least one of design information and manufacture information of the printed circuit board.

4. The apparatus for hair inspection according to claim 2, wherein the inspection unit obtains, with a plurality of color lights, a master color image of a master board that is an ideal printed circuit board, and the control device obtains the resist area information by at least one of obtaining a hue image of the master board from the master color image, and extracting from the hue image an area having a hue that matches a hue of the resist area, and obtaining a saturation image of the master board from the master color image, and extracting from the saturation image an area having a saturation that matches a saturation of the resist area.

5. The apparatus for hair inspection according to claim 2, wherein the control device obtains the resist area information by at least one of extracting, from the hue image of the inspection object board, an area having a hue that matches a hue of the resist area, and extracting, from the saturation image of the inspection object board, an area having a saturation that matches a saturation of the resist area.

6. A method for hair inspection in a green resist area on a printed circuit board on which solder paste is printed, the method comprising:

obtaining, with a plurality of color lights, a color image of an inspection object board that is the printed circuit board as an inspection target;

obtaining a hue image of the inspection object board from the color image;

obtaining a saturation image of the inspection object board from the color image;

detecting first hair including at least one of brown hair and blond hair in at least the resist area of the hue image based on a hue difference of the first hair relative to the resist area; and detecting second hair including at least one of black hair and grey hair in at least the resist area of the saturation image based on a saturation difference of the second hair relative to the resist area, wherein the first hair is detected based on only the hue image without a lightness image of the inspection object board, and the second hair is detected based on only the saturation image without the lightness image of the inspection object board.

7. The method for hair inspection according to claim 6, further comprising:

obtaining resist area information that specifies a range occupied by the resist area in the inspection object board, wherein the detecting the first hair and the second hair include detecting the first hair and the second hair with respect to, as the inspection target, the resist area specified by at least the resist area information.

\* \* \* \* \*